United States Patent
Uchiyama

[19]

[11] Patent Number: 6,034,338
[45] Date of Patent: Mar. 7, 2000

[54] LEVER SWITCH ARRANGEMENT USED FOR VEHICLES

[75] Inventor: Norio Uchiyama, Tokyo, Japan

[73] Assignee: Niles Parts Co., Ltd., Japan

[21] Appl. No.: 09/059,429

[22] Filed: Apr. 14, 1998

[30] Foreign Application Priority Data

Jun. 30, 1997 [JP] Japan ..................... 9-189031

[51] Int. Cl.⁷ .............. H01H 3/16; H01H 9/00; H01H 21/00
[52] U.S. Cl. ................. 200/61.27; 200/61.54; 200/292; 200/303
[58] Field of Search .......... 200/4, 61.27–61.38, 200/61.54, 61.55–61.57, 292, 303, 553, 560, 562; 403/343

[56] References Cited

U.S. PATENT DOCUMENTS

| | | | |
|---|---|---|---|
| 5,708,242 | 1/1998 | Uchiyama ............. | 200/61.54 |
| 5,780,794 | 7/1998 | Uchiyama et al. ....... | 200/61.54 |
| 5,804,784 | 9/1998 | Uchiyama et al. ....... | 200/61.54 |
| 5,831,231 | 11/1998 | Uchiyama ............. | 200/61.54 |
| 5,900,601 | 5/1999 | Uchiyama ............. | 200/61.27 |

FOREIGN PATENT DOCUMENTS 3-2533  1/1991  Japan .

*Primary Examiner*—J. R. Scott
*Attorney, Agent, or Firm*—Rader, Fishman & Grauer; Ronald P. Kananen

[57] ABSTRACT

A lever switch arrangement used for vehicles comprising a first outer lever (3) provided with an operation rod (3a) at a base end portion thereof, a second lever (6) having a cylinder portion (6a) freely inserted into the first lever (3), and a third lever (22) rotatably inserted into the cylinder portion (6a) of the second lever (6). The switch arrangement further comprises a rotary knob (4) fixed at one end of the third lever, and an operation rod (22a) at another end thereof. A movable member (34) adapted to be operated in relation to the third lever (22) has a movable contact (35) and is rotatably fixed on a shaft rod (32a). The shaft rod (32a) is provided with a first substrate (14) at one end of the shaft rod (32a) and a second substrate (32) at another end thereof. The second substrate (32) is provided with a projection rod (32d) to be inserted into a through hole (14c) mounted on the first substrate (14), the second substrate (32) being integrally formed with the shaft rod (32a). The movable member (34) is rotatably disposed between the first substrate (14) and the second substrate (32). The first substrate (14) is adapted to be fixed with a terminal plate (15) having terminals (15a) at the lower end portion of the terminal plate (15) and a through hole (15c). The second substrate (32) is integrally formed with a projection rod (32b) to be inserted into the through hole (15c) of the terminal plate (15).

15 Claims, 4 Drawing Sheets

LEVER SWITCH ARRANGEMENT USED FOR VEHICLES

BACKGROUND OF THE INVENTION

1. Field of the Invention

The present invention relates generally to lever switches for vehicles and, in particular, to a lever switch arrangement in which a rotary knob is mounted at an end point of the lever.

2. Description of the Related Art

A conventional rotary switch arrangement is shown, for example, in Japanese Utility Model Application Laid-Open No. 3-2533. The conventional rotary switch has a rotation shaft of a movable plate formed with an integral knob. The rotation shaft is inserted into a substrate through a compression spring, and the end point of the rotation shaft is supported by using a stopper ring.

A problem with the above-mentioned conventional rotary knob arrangement is that fabrication of the rotary switch is inefficient since the rotation shaft is fixed by using the stopper ring.

SUMMARY OF THE INVENTION

An object of the present invention is to provide a lever switch arrangement for a vehicle that solves the problems associated with the conventional switch arrangement described above.

More specifically, an object of the present invention is to provide a lever switch used for vehicles in which movable members movable in relation with a rotary knob are fixed by using snapping means, thereby increasing the fabrication performance for parts such as movable members.

Additional objects, advantages and novel features of the invention will be set forth in part in the description that follows, and in part will become apparent to those skilled in the art upon examination of the following or may be learned by practice of the invention.

The present invention has been made to solve the problems in the conventional rotary switches. According to the present invention, there is provided a lever switch arrangement used for vehicles comprising a rotary knob, a third lever having the rotary knob fixed at one end of the third lever and an operation rod at another end thereof, and a movable member adapted to be operated in relation to the third lever having a movable contact and rotatably fixed on a shaft rod. The lever switch arrangement is characterized in that the shaft rod is provided with a first substrate at one end of the shaft rod and a second substrate at another end thereof, and the second substrate is provided with a projection rod to be inserted into a through hole mounted on the first substrate.

The present invention further provides a lever switch arrangement in which the second substrate is integrally formed with the shaft rod, and the movable member is rotatably disposed between the first substrate and the second substrate.

The present invention also provides a lever switch arrangement in which the first substrate is adapted to be fixed with a terminal plate having terminals at the lower end portion of the terminal plate and a through hole, and the second substrate is integrally formed with a projection rod to be inserted into the through hole.

The present invention further provides a lever switch arrangement in which the movable member has an engaged portion to be engaged with a gear-shaped operation rod mounted at one end of the third lever, and the third lever is adapted to be fixed with the rotary knob at another end of the third lever.

The present invention also provides a lever switch arrangement in which the second substrate has terminals projected at the lower end of the second substrate, the terminals being disposed at the bottom portion of an opening portion of a pole box together with the terminal plate, and the opening portion being closed with a case, and further the terminals being inserted into a connector formed with the pole box.

The present invention further provides a lever switch arrangement in which the third lever is rotatably inserted into a cylinder portion of the second lever to be swingable around a shaft portion, and the shaft portion of the second lever being supported by a movable plate adapted to be rotatable in the horizontal direction, and the cylinder portion being freely inserted into the first lever.

The present invention also provides a lever switch arrangement in which the first lever is provided with an operation rod at the base end portion of the first lever, and the operation rod being adapted to operate a first movable member through a push rod in accordance with the rotational operation of the first lever.

The present invention further provides a lever switch arrangement in which the push rod is adapted to be supported by a cylindrical portion formed on the movable plate, and the first movable member being movably mounted in the vertical direction between the first substrate and the second substrate.

BRIEF DESCRIPTION OF THE DRAWINGS

The present invention will become more clearly appreciated as the disclosure of the invention is made with reference to the accompanying drawings. In the drawings.

DESCRIPTION OF THE PREFERRED EMBODIMENTS

A preferred embodiment of a lever switch arrangement according to the present invention will now be described in detail with reference to FIGS. 1 to 7 of the accompanying drawings.

Figure 1:
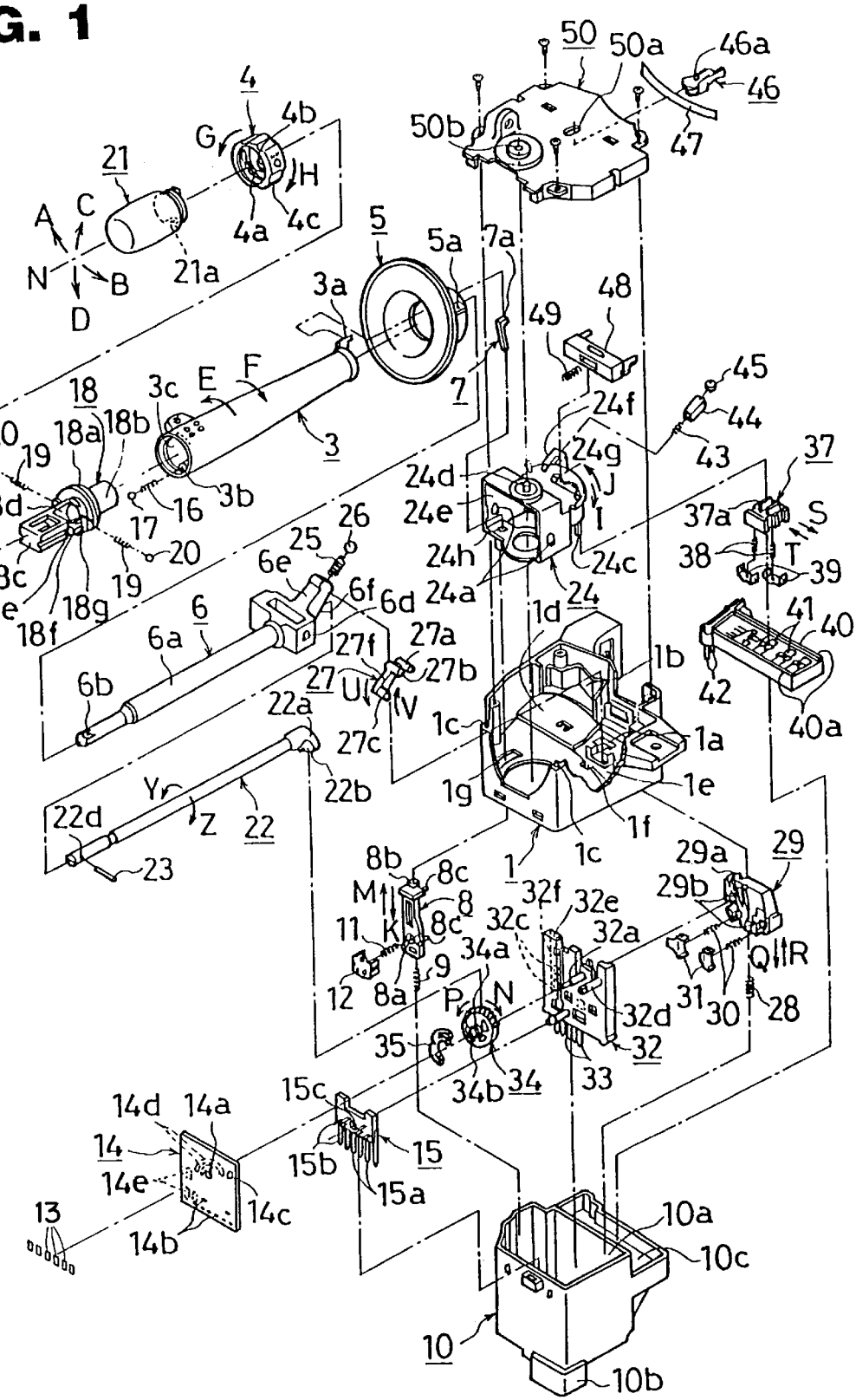
FIG. 1 is a partially exploded perspective view showing a preferred embodiment of the present invention.
Figure 2:
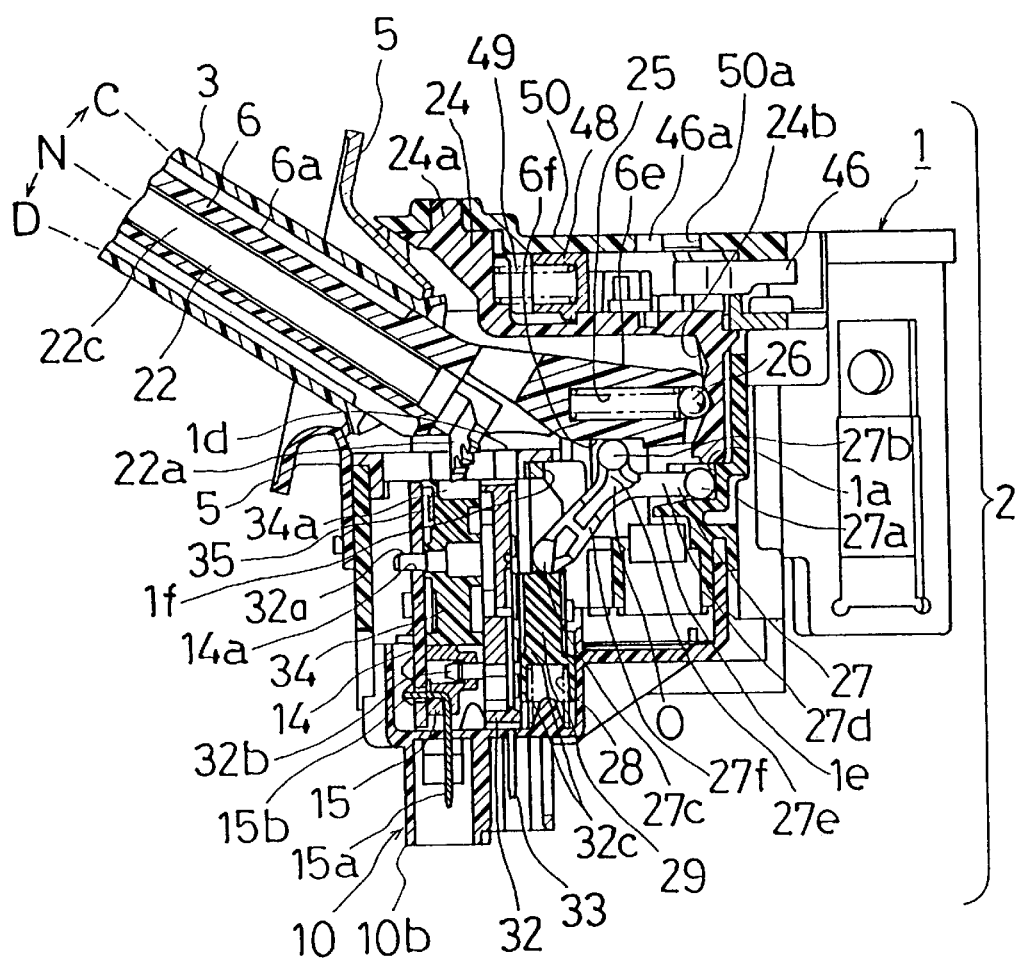
FIG. 2 is an enlarged sectional view showing a main portion of the embodiment shown in FIG. 1.
Figure 3:
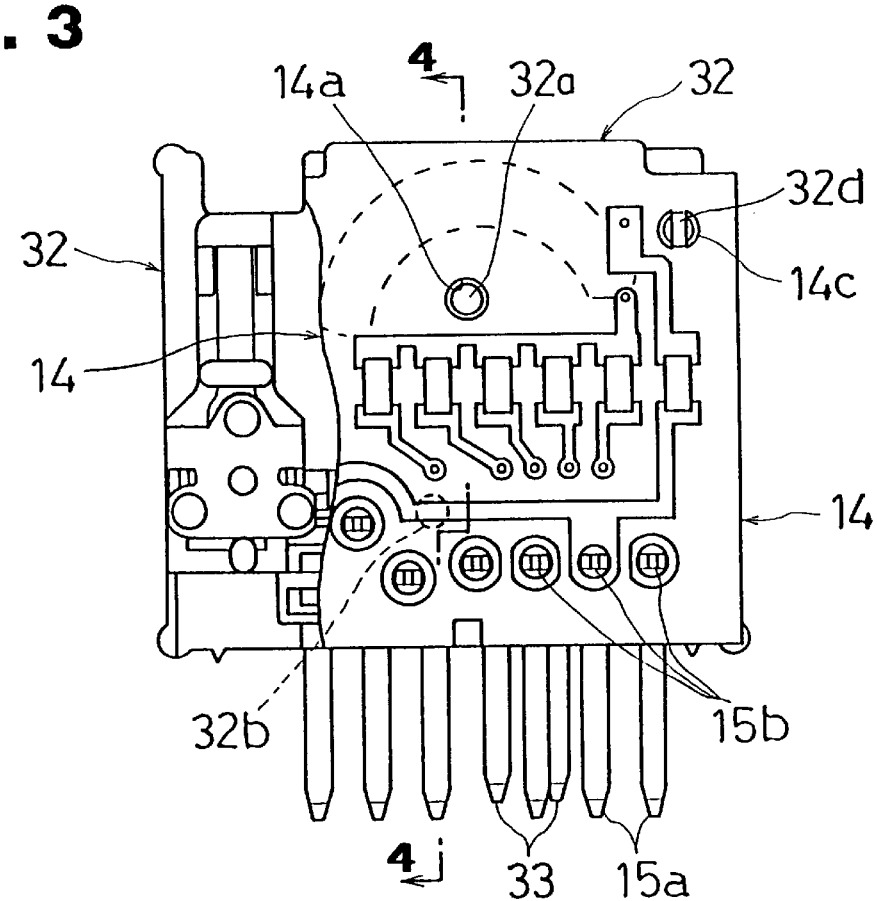
FIG. 3 is an enlarged front view showing a first substrate assembled with a second substrate.
Figure 4:
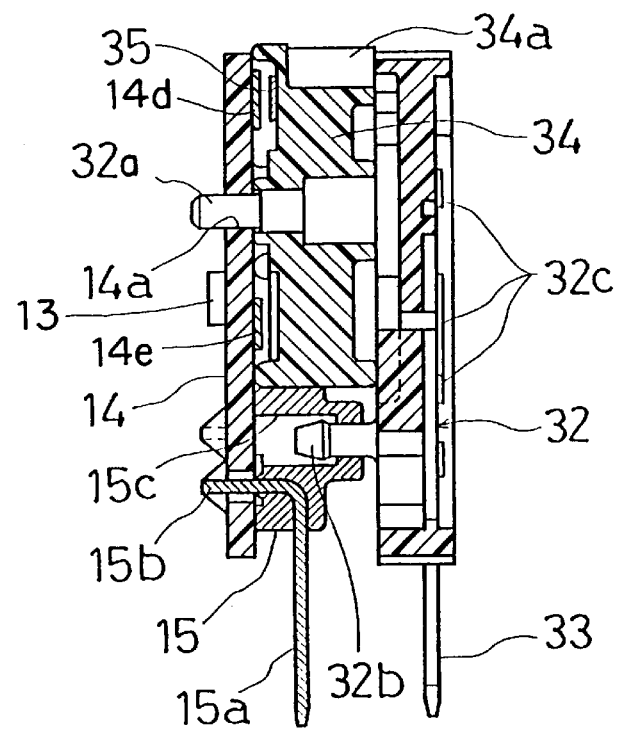
FIG. 4 is a sectional view taken along the line 4—4 in FIG. 3.

A case 1 is mounted at, for example, the left side of a body (not shown) of a combination switch 2 used for vehicles. The case 1 and the combination switch 2 shown in FIGS. 1 and 2 are mounted adjacent to a steering wheel, and are illustrated as switches used for vehicles having a left side steering wheel, as an embodiment of the present invention. The present invention may also be used for vehicles having a right side steering wheel by disposing the case 1, the combination switch 2, and the other parts mentioned hereinafter in a symmetrical arrangement.

The body has a cylindrical tube at a central portion of the body into which a steering shaft (not shown) is inserted. The case 1 may be inserted into the body, for example, from the left side and screwed onto a steering column (not shown).

The combination switch 2 is provided with the function of a turn-signal switch, a passing switch, a main/dimmer switch, and a wiper/washer switch. The combination switch 2 performs the function of a turn-signal switch for flashing direction indicating lamps by operating a first outer level 3 in the right and left directions, as shown by arrows A and B in FIG. 1.

The combination switch 2 performs the function of a passing switch, in which head lamps are energized temporarily, by moving the first lever 3 to the upper side, as shown by arrow C in FIG. 1. Moreover, the combination switch 2 performs the function of a main/dimmer switch, in which head lamps are switched to main or dimmer illumination, by moving the first lever 3 to the upper side or the down side, as shown by arrows C and D in FIG. 1.

Moreover, the combination switch 2 performs the function of a wiper/washer switch, in which wiper blades are reciprocally moved three or four times and washer liquid is emitted towards the front glass, by rotating the first lever 3 in the direction shown by arrow E in FIG. 1. Furthermore, a rotary knob 4 mounted at the end point of the first lever 3 performs the function, in which the wiper blades are reciprocally moved at different speeds or intermittently moved, by rotating the rotary knob 4 in the direction of arrow G or H in FIG. 1.

The first lever 3 has a generally cylindrical shape in which the diameter at the one side of the rotary knob 4 is large, and the diameter at the other side of the case 1 is small. The first lever 3 has a boot 5 with a flare-shaped opening mounted at the side of the case 1. A second lever 6 formed as a cylindrical member is inserted into the opening. Moreover, the first lever 3 can be rotatable around the shaft portion 6d of the second lever 6 in the direction shown by arrow E, and automatically restored in the direction shown by arrow F, thereby effecting the wiper/washer switch.

The first lever 3 has a projected operation rod 3a at the end side of the case 1 to be contacted with pressure to a push rod 7, thereby making a first movable member 8 move in the vertical direction, as shown by arrows K and M. The operation rod 3a is formed as a piece projected at the end of the first lever 3. The operation rod 3a can be rotated together with the first lever 3, thereby pushing down the head portion 7a of the push rod.

Thus, the push rod 7 has a generally L-shaped member made of metal material having the head portion 7a. The push rod 7 is supported by being vertically inserted into a cylindrical portion 24h formed at the bottom portion of an opening portion 24e of a movable plate 24. The cylindrical portion 24h inserted into the push rod 7 is disposed movably in the horizontal directions within a through hole 1g mounted at the bottom surface 1d of the case 1. The push rod 7 is usually pressed by the first movable member 8 energized by a return spring 9, thereby usually contacting the head portion 7a with the operation rod 3a.

The boot 5a has a flare-shaped opening and, therefore, the base portion 6c of the second lever 6 and the movable plate 24 are hidden from the driver's eyes when the boot 5 is attached with the case 1. The boot 5 is fixed in such a manner that a projected portion 1c of the case 1 is inserted into a through hole 5a mounted at the rear surface side of the boot 5, and held by the case 1 and a lid member 50. The first movable member 8 holds the push rod 7 made of metallic material or the like, and is disposed within the bottom of the opening portion 10a of the pole box 10 through a restoring spring 9. The first movable member 8 further holds a movable contact plate 12 through a contact spring 11 at the side surface of the first movable member 8. The first movable member 8 has a hole 8a for receiving the contact spring 11 at the side surface of the first substrate 14, and a hole (not shown) for receiving the restore spring 9 at the lower surface thereof.

The first movable member 8 has a notch 8b at its upper surface to be received with the lower portion of the push rod 7, and guiding projections 8c adapted to be contacted with a guiding groove 32e formed on a second substrate 32 in the vertical direction. The first movable member 8 thereby moves in accordance with the guidance of the guiding groove 32e in the vertical direction, as shown by arrows K and M, when the operator rotates the first lever 3 thereby pushing the first movable member 8 by the push rod 7. Then, when the movable contact plate 12 contacts with the fixed contacts 14e, the wiper/washer operation of the wiper blades is energized.

A first substrate 14 is provided with fixed contacts 14d and 14c printed thereon. Electronic parts 13 and a terminal plate 15 are soldered at the solder portions 15b of the terminal plate 15. The fixed contacts 14d and 14e may be made by a metallic plate to be caulked to the first substrate 14. The electronic parts 13 are the elements such as resistors or the like for composing an intermittent wiper circuit or the like. The terminals 15a and the solder portions 15b composing the terminal plate 15 are formed through an insert molding method. The first substrate 14 and the terminal plate 15 are inserted into the opening portion 10a, thereby being pressed with the lower surface 1d of the bottom of the case 1. The terminals 15a are then inserted into the connector portion 10b thereby fixing them.

The first substrate 14 may be a printed plate provided with a shaft hole 14a for receiving the shaft rod 32a mentioned hereinafter, a through hole 14b for receiving the solder portion 15b of the terminals 15a, and a through hole 14c to be contacted to the contact projection 2b of the second substrate 32. The first substrate 14 has the fixed contacts 14d and 14e and the terminal plate 15 on the surface on which the first movable member 8 is disposed. The fixed contact 14d is composed of two arc-shaped contacts around the shaft hole 14a, and the fixed contact 14e is composed of two contacts located at positions on which the fixed contact 14e may be contacted with the movable contact plate 12 when the first lever 3 has been moved downwardly.

The terminal plate 15 is integrally formed with the terminals 15a projected from the lower surface thereof. The solder portions 15b, which are integrally formed with the terminals 15a, are projected from the side surface of the terminal plate 15. The terminal plate 15 is formed with the terminals 15a and the solder portions 15b by using an insert molding method, for example. The terminal plate 15 has a through hole 15c to be contacted to the shaft rod 32a projected from the second substrate 32 at a central portion thereof. The lower portion of the terminal plate 15 is fitted on the inner bottom of the opening 10a. The terminals 15a are mounted on the connector portion 10b, and the solder portions 15b are fixed by using solder on the through holes 14b of the first substrate 14. The shaft rod 32a is fitted to the through hole 15c.

The first lever 3 has blind hole 3b for receiving a steel ball 17 and a click spring 16 in an inner side of the opening portion 3c of the side of the rotary knob 4. The steel ball 17 is energized by the click spring 16 and is pressed to a click groove (not shown). The click groove is formed at the side surface of the side of the first lever 3 on the flange portion 18a mounted at a center of a fixing body 18. The click spring 16 thereby automatically restores the first lever 3.

The fixing body 18 is inserted into the opening portion 3c of the first lever 3, and is composed of a cylindrical portion 18b into which the end point of the cylinder portion 6a is inserted. The flange portion 18a of the fixing body 18 is provided with click springs 19 and steel balls 20 that are movable, and a contact portion 18c for fixing the fixing knob 21. The fixing body 18 is fixed on the second lever 6 in such a manner that the resilient stopper claw 6b at the point of the cylinder portion 6a which is inserted into the first lever 3 and the cylindrical portion 18b, is contacted on the edge of the notch portion 18d adjacent to the flange portion 18a. Thus, the first lever 3 can be rotatably supported by the second lever 6 in such a manner that the cylinder portion 6a is inserted into the first lever 3, and there are provided a base potion 6c at one end and the flange portion 18a at another end thereof.

At the periphery of the flange portion 18a, there are provided blind holes 18g for receiving the click springs 19 and the steel balls 20, respectively, and the rotary knob 4 at the periphery thereof. In the inner surface of the rotary knob 4, there are formed click grooves 4a to be pressed with the steel balls 20 and the projections 4b slidably contacting the flange portion 18a. The contact portion 18c is formed with a projection 18e for contacting a guiding groove (not shown) formed within the fixing knob 21, and claws 18f for contacting the contact pieces 21a mounted on the opening end of the fixing knob 21.

The second lever 6 has shaft portions 6d at both sides of the base portion 6c for fitting shaft holes 24a of the movable plate 24. Thus, the second lever 6, the first lever 3 and the third lever 22 can be swingable around the shaft portion 6d in the direction shown by arrows C and D in FIGS. 1 and 2. The base end portion 6c has the shaft portions 6d at one side thereof and a click member projection 6e for receiving a click spring 25 and a steel ball 26 energized by the click spring 25 at the other side thereof. The steel ball 26 is pressed to click grooves 24b formed in the inner wall of the movable plate 24, as shown in FIG. 2.

The click member projection 6e is formed with a pressing surface 6f for pressing the contact portion 27b of an arm body 27 at the lower side of the projection 6e. When the first lever 3 is operated in the directions of arrows C and D, the second lever 6 moves vertically around the shaft portion 6d thereby moving the arm body 27.

The arm body 27 is composed of a shaft portion 27a, a contact portion 27b, a pressing portion 27c, and a first arm 27d, a second arm 27e and third arm 27f for connecting the above portions, respectively. The arm body 27 is movably supported in such a manner that the shaft portion 27a made of a general cylinder-shape is fitted into a shaft groove 1a formed on the case 1, and both of the case 1 and the lower surface of the movable plate 24 hold rotatably the plate portion 27.

The shaft supporting groove 1a is formed in a T-character shape at the corner on the inner bottom surface 1d of the case 1 for receiving the shaft portion 27a of the arm body 27 and the first arm 27d adjacent to the shaft portion 27a. The case 1 is formed with a through hole 1e for receiving the third arm 27f of the arm body 27 and the projection 24c of the movable plate 24 adjacent to the shaft supporting groove 1a, so that the arm body 27 can be effected with a swing movement. The through hole 1e is formed with a notched portion 1f, at the opposite position to the shaft supporting groove 1a, for receiving the third arm 27f and being contacted to the pressing portion 27c.

The contact portion 27b has a cylinder-shaped portion at which the pressing portion 6f is pressed. The pressing portion 27c moves a second movable member 29 energized by a spring 28 in the directions as shown by arrows Q and R in FIG. 1 opposite to the resilient force due to the spring 28. The pressing portion 27c has a cylinder-shaped portion projected from the point of the third arm 27f. The pressing portion 27c is disposed between the lower surface of the inner bottom surface 1d of the case 1 and the second movable member 29. The pressing portion 27c is pressed by the second movable member 29 usually energized by the spring 28.

The first arm 27d extends from the shaft portion 27a in the horizontal direction, as shown in FIG. 2. The second arm 27e is extended from the contact portion 27b in the downward direction, and the first arm 27d and the third arm 27f are extended in the direction different from each other, as shown in FIG. 7.

Figure 7:
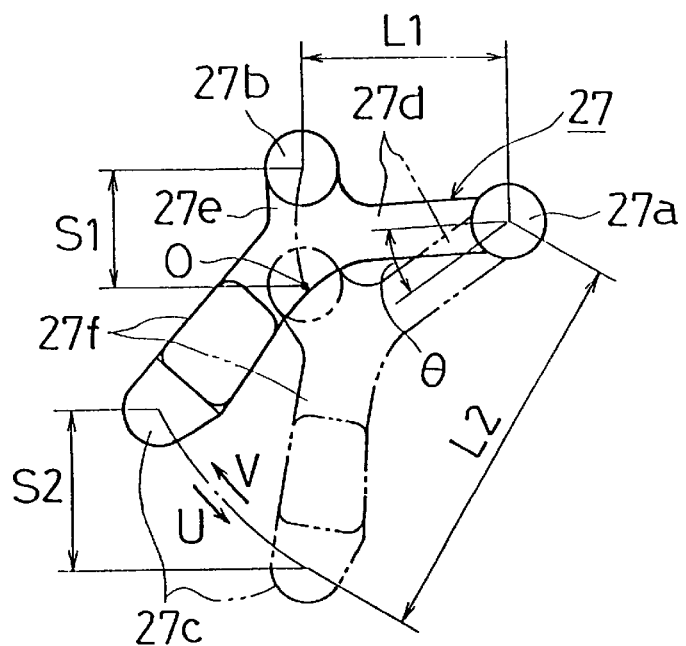
FIG. 7 is a view for explaining the rotation state of an arm body.

The arm body 27 has the following relation where the length between the shaft portion 27a and the contact portion 27b is set as L1, and the length between the shaft portion 27a and the pressing portion 27c is set as L2, as shown in FIG. 7.

$$L1<L2$$

By this relation, when the arm body 27 rotates around the shaft portion 27a located at one end by being pressed by the pressing surface 6f, as shown by arrows U and V by the angle θ° in FIG. 7, the pressing portion 27c located at another end of the arm body 27 moves longer than the contact portion 27b. Namely, the moving distance of the second movable member 29 becomes enlarged in the vertical directions, as shown by arrows Q and R in FIG. 1, since the arm body 27 is disposed between the second movable member 29 and the second lever 6.

The second movable member 29 has a blind hole 29b at the side surface for inserting the contact springs 30 and the movable contact plates 31 held through the contact springs 30. The second movable member 29 has a blind hole (not shown) at its lower surface for receiving the spring 28. If the first lever 3 is operated in the directions shown by arrows C and D, the second movable member 29 is pressed by the arm body 27, thereby moving vertically and performing a main/dimmer switching operation and a passing operation. If the second movable member 29 moves in the vertical direction, as shown by arrows Q and R, the movable contact plate 31 contacts with the fixed contacts 32c mounted on the second substrate 32, thereby effecting the switch to ON-state.

The second substrate 32 has the fixed contact 32c at the side surface of the second movable member 29 side, and a guide groove 32f for contacting with the guide projection 29a of the second movable member 29. The second substrate 32 forms a shaft rod 32a at the side surface of the first substrate 14 side, the contact rods 32b and 32d, and the guiding groove 32e. The second substrate 32 is formed with the projected terminal 33 connected to the fixed contact 32c by using an insert molding method.

The lower end of the second substrate 32 is fitted on the inner bottom of the opening 10a of the pole box 10, and the opening 10a is covered by the case 1. Therefore, the second substrate 32 is held by the bottom of the opening 10a and the inner bottom surface 1d of the case 1. Moreover, the terminals 33 of the second substrate 32 are inserted into the connector 10b of the pole box 10, and the shaft rod 32a is fitted into the shaft hole 14a of the first substrate 14. The contact rods 32b and 32d are inserted into the through holes 15c and 14c, respectively, thereby fixing the second substrate 32 within the pole box 10 more rigidly.

The shaft rod 32a and the contact rods 32b and 32d are formed integrally with the second substrate 32 by using, for example, resin material. The shaft rod 32a has a length by which the point of the shaft rod 32a projects from the surface of the first substrate 14 after being inserted into the shaft hole 14a, as shown in FIG. 2. Moreover, the shaft rod 32a may be made of a metallic material to be fixed on the second substrate 32. The shaft rod 32a projected from the second substrate 32 and the contact rods 32b and 32d may be formed on the first substrate 14 and the terminal plate 15 at the opposite position to the second substrate 32. The shaft hole 14a of the first substrate 14, the through hole 14c, and the through hole 15c of the terminal plate 15 may be formed on the second substrate 32.

The contact rod 32b and 32d may be made, for example, as the same structure with each other and have a slit, respectively, thereby providing resilient property and claws engaged with the edges of the through holes 15c and 14c. The contact rod 32b is formed to be projected toward the first substrate 14 from the upper portion of the second substrate 32. The contact rod 32d is formed to be projected toward the terminal plate 15 from the lower portion of second substrate 32.

The fixing knob 21 is fixed on the fixing body 18 by being contacted to the contact portion 18c of the fixing body 18, and further by the fixing piece 21a being contacted to the projecting piece 15c. According to the structure mentioned above, the fixing knob 21, the fixing body 18, and the second lever 6 are moved integrally.

The third lever 22 has the rotary knob 4 at one end thereof and the operation rod 22a at another end thereof, and is rotatably inserted into the second lever 6. The rotary knob 4 is fixed on the third lever 22 in such a manner that the pin 23 is fitted to the hole 22d through the through hole 4c of the rotary knob 4 in the condition that the shaft rod 22c of the third lever 22 is inserted into the cylinder portion 6a and the hole 22d to be inserted with the pin 23 disposed within the cavity 15d of the fixing body 18.

Figure 5:
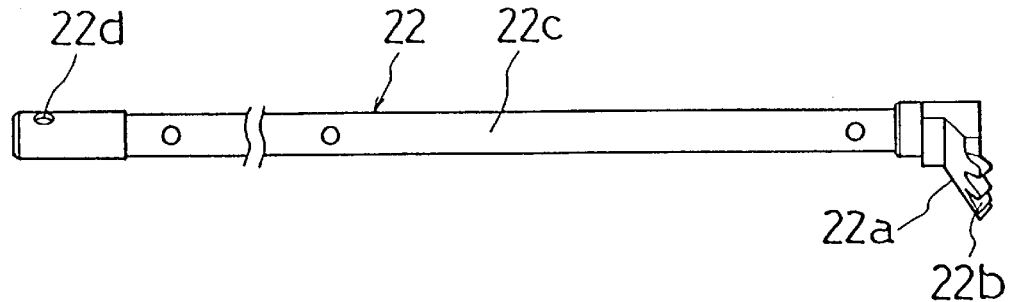
FIG. 5 is an enlarged side view showing a third lever of the embodiment shown in FIG. 1.
Figure 6:
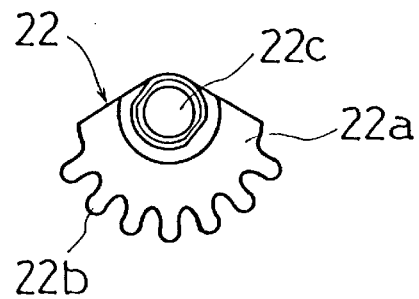
FIG. 6 is an enlarged end view showing the third lever.

The operation rod 22a may be integrally formed at one end of the third lever 22 or formed as a gear-shaped member. The operation rod 22a functions as the transmission member having an engaged portion 22b with a gear-shape and a flare-shape, as shown in FIG. 6. The engaged portion 22b at the end of the operation rod 22a is projected in the direction slanted with respect to the center line of the third lever 22, as shown in FIG. 5. The operation rod 22a engages to the engaged portion 34a with a gear-shape of the third movable member 34, when the first lever 3 is located at a neutral position, as shown in FIG. 2.

The operation rod 22a makes the third movable member 34 rotate in the direction shown by arrows N and P, by being rotated in the directions shown by arrows Y and Z, when the rotary knob 4 is rotated in the directions shown by arrows G and H. Moreover, when the first lever 3 is moved in the directions shown by arrows C and D, the operation rod 22a engages to the engaged portion 34a of the third movable member 34 in the slanted state of the engaged portion 22b.

The third movable member 34 is a rotary member with a gear shape having the engaged portion 34a at the peripheral portion thereof. The third movable member 34 is rotatably fixed in such a manner that the shaft rod 32a of the second substrate 32 is inserted into the shaft hole 34b mounted at the center of the third movable member 34, and the end of the shaft rod 32a is rotatably fitted on the shaft hole 14a of the first substrate 14. The third movable member 34 is fixed with the movable contact piece 35 with an arc-shape made of conductive metallic spring material at the periphery of the shaft hole 34b. When the third movable member 34 rotates in the direction shown by arrows N and P, the movable contact piece 35 contacts on the fixed contact 14d mounted on the first substrate 14, thereby operating the wiper blades, for example, in intermittent movement, low speed and high speed, sequentially.

The movable plate 24 is rotatably supported in such a manner that the movable plate 24 is placed on the inner bottom surface 1d of the case 1, and the shaft portion 24d is fitted on the shaft hole 50b of a lid member 50. When the first lever 3 is rotated in the directions shown by arrows A and B, the movable plate 24 rotates around the shaft portion 24d in the direction shown by arrows I and J together with the second lever 6. The movable plate 24 is provided with the projection. 24c to be contacted with the contact portion 37a of the fourth movable member 37 at the lower surface side. The fourth movable member 37 is adapted to hold the movable contact plate 39 through the contact spring 38 at the lower surface thereof.

When the first lever 3 is moved in the directions shown by arrows A and B, the movable plate 24 rotates in the directions shown by arrows I and J and, therefore, the fourth movable member 37 moves in the direction shown by arrows S and T together with the movable contact plate 39 in relation to the movable plate 24. The fourth movable member 37 is located between the lower surface of the inner bottom surface 1d of the case 1 and the plate surface of the third substrate 40. The fourth movable member 37 moves along with the straight line, as shown by arrows S and T, by being guided by the edge 40a of the third substrate 40.

The fourth movable member 37 is formed with the contact portion 37a as two projection pieces for receiving the projection 24c, and a blind hole (not shown) into which the contact spring 38 is movably inserted at the lower surface thereof. The movable contact plate 39 energizes the flasher operation by being contacted with the fixed contacts 41 on the third substrate 40.

The third substrate 40 provides the first contacts 41 and the terminals 42 to be conducted with the fixed contact 41 by using an insert molding method. The third substrate 40 is fitted on the receiving portion 10c of the pole box 10, and the terminals 42 are projected from the pole box 10 downwardly.

The movable plate 24 is formed with the opening portion 24e disposed at the first lever 3 side for receiving the base end portion 6c of the second lever 6 so that the base end portion 6c can be rotatable by a predetermined angle. A click body inserting cylinder portion 24f is projected from the movable plate 24 on the side opposite to the opening portion 24e for receiving a click spring 43 and a click body 44. The click body 44 rotatably supports a ball 45, which is pressed to a click groove 1b at the end of the click body 44.

The case 1 is covered by the lid member 50 by using screws in order to enclose, in the upper side of the case 1, the movable plate 24, a cancel cam 46, a spring plate 47, a cam guide 48, and a coil spring 49. The case 1 is closed by the pole box 10 in order to enclose, in the lower side of the case 1, the push rod 7, the first movable member 8, the first substrate 14, the terminal plate 15, the second substrate 32, the third movable member 34, and the second movable member 29. The case 1 receiving the above-mentioned members or parts is fixed on the body by using screws.

The cancel cam 46 has shafts 46a on the upper surface and the lower surface thereof, respectively. The lower shaft 46a is fitted to the groove 24g mounted on the movable plate 24, and the upper shaft 46a is freely fitted to the longitudinal hole 50a mounted on the lid member 50. Both ends of the spring plate 47 are held by the lid member 50, and the central portion of the spring plate 47 is adapted to push the cancel cam 46. The cam guide 48 is located over the movable plate 24 and energized by the side of the cancel cam 46 by the coil spring 49. The lid member 50 is fitted on the opening end at the upper side of the case 1.

Referring now to the preferred embodiment of the present invention constructed as described above, the operation thereof will be described hereinafter.

If the rotary knob 4 is rotated in the direction shown by the arrow G, the third lever 22 mounted on the rotary knob 4 rotates in the direction shown by arrow Y. In accordance with the rotation of the third lever 22, the third lever 22 rotates together with the operation rod 22a, whereby the third movable member 34 is rotated in the direction shown by arrow N. The movable contact piece 35 rotating together with the third movable member 34 contacts on the fixed contact 14d thereby effecting an intermittent wiping operation of the wiper blades. Moreover, when the rotary knob 4 is rotated in the direction shown by arrow E, the parts mentioned above are rotated, thereby effecting a low continuous operation of the wiper blades. If the rotary knob 4 is further rotated in the direction shown by arrow E, the speed of the wiper's operation is made higher.

By the structure that the third lever 22 forms the operation rod 22a and the movable member 34 engages to the engaged portion 34a, it becomes possible to increase the number of the fixed contacts 14d. This makes it possible to enlarge the rotation angle of the rotary knob 4 because of the engagement between the engaged portion 22b of the operation rod 22a and the engaged portion 34a of the third movable member 34, even when the rotary knob 4 is rotated to a large extent in the directions shown by arrows E and F.

If the rotary knob 4 is rotated in the direction shown by arrow H, the third lever 22 and the operation rod 22a rotate in the direction shown by arrow Z. The movable contact piece 35 is switched together with the third movable member 34 engaged to the operation rod 22a thereby switching the wiper's operations among the lower speed position, the intermittent position, and the OFF position. The wiper operation is stopped at the OFF position thereof.

When the first lever 3 is moved upwardly in the direction shown by arrow C, the first lever 3, the second lever 6 and the third lever 22 rotate around the shaft portion 6d. Even when the third lever 22 rotates in the directions shown by arrows C and D, the length of the engaged portion between the engaged portion 22b of the operation rod 22a and the engaged portion 34a of the third movable member 34 is set to be large and, therefore, they are not separated from each other. The arm body 27 is rotated in the direction shown by arrow T around the shaft portion 27a when the contact portion 27b of the arm body 27 is pressed by the pressing surface 6f of the second lever 6.

The contact portion 27b and the pressing portion 27c rotate around the shaft portion 27a with a radius L2 corresponding to the length from the shaft portion 27a to the pressing portion 27c, by angle θ in the directions shown by arrows U and V. When the contact portion 27b is pressed by the length S1, as shown in FIG. 7, the pressing portion 27c moves by the length S2, which is longer than the length S1.

The second movable member 29 moves downwardly to a large extent in the direction shown by arrow Q, since the moving stroke of the pressing surface 6f of the second lever 6 is enlarged due to the arm body 27, thereby effecting the passing and the main/dimmer switch operations.

It is possible to make longer the distance between the fixed contact 32c to be contacted to the second movable member 29 for the passing operation and the fixed contact 32c for the main/dimmer operation, since the moving stroke of the second movable member 29 is made longer. By this, any insufficient contact can be removed and the entire size of the second movable member and the combination switch 2 can be minimized.

If the first lever 3 is operated in the direction shown by arrow A, the first lever 3, the second lever 6, the third lever 22 and the movable plate 24 rotate around the shaft portion 24d. Even when the third lever 22 is rotated in the direction shown by arrows A and B, the length of the engaged portion between the engaged portion 22b of the operation rod 22a and the engaged portion 34a of the third movable member 34 is made to be longer and, therefore, they are not separated from each other. The movable plate 24 rotates in the direction shown by arrow I so that the projection 24c at the lower surface makes the fourth movable member 37 move in the direction shown by arrow S.

The movable plate 24 is guided by the edge 40a of the third substrate 40 to move along the straight line shown by arrow S, thereby effecting the flasher operation. When the first lever 3 is moved in the direction shown by arrow B, each of the parts moves in the direction opposite to the direction shown by arrow A.

The first lever 3 can rotate around the axis of the third lever 22 in the direction shown by arrow E. The operation rod 3a rotates together with the first lever 3 in the direction shown by arrow E, thereby moving the push rod 7 downwardly. The push rod 7 moves the first movable member 5 and the movable contact plate 12 in the direction shown by arrow K downwardly so that the movable contact plate 12 contacts to the fixed contacts 14e, thereby effecting the washer operation due to the wiper blades.

When the first lever 3 is released, the first lever 3 is restored to the original OFF position in such a manner that the steel ball 17 energized by the click spring 16 moves in accordance with the guide of the click groove of the fixed body 18. The push rod 7 and the first movable member 8 are restored to the original OFF position due to the energization of the restoring spring 9, thereby stopping the washer operation of the wiper blades.

In assembling the third movable member 34, the movable member 34 is rotatably supported in such a manner that the soldering portion 15b of the terminal plate 15 is inserted into the through hole 14b, the third movable member 34 is inserted into the shaft rod 32a of the second substrate 32, the shaft rod 32a is inserted into the shaft hole 14a, the contact projection rod 32b is inserted into the through hole 15c, and the contact projection rod 32d is inserted into the through hole 14c.

The movable member 34 is easily assembled by inserting the shaft rod 32a into the shaft hole 34b and the shaft rod 32a into the shaft hole 14a, respectively. The second substrate 32 and the first substrate 14 are positioned in parallel with each other in such a manner that the shaft rods 32a mounted on the upper and lower sides of the second substrate 32, and the contact projection rods 32b and 32d, are contacted to the shaft holes 14a, and the through holes 15c and 14c, respectively, thereby making the rotation of the movable member 34 stable. Moreover, since the second substrate 32 and the first substrate 14 are positioned with each other, the fixed contacts 14d, 14e, and 32c can be exactly positioned on each correct position.

The second substrate 32 and the first substrate 14 are located in parallel with each other. Further, the first movable member 8, the third movable member 34, and the second movable member 29 and the like are positioned on the front and rear sides of the second substrate 32, which results in an effective reception of many parts within the pole box 10 and a minimized occupation space.

As mentioned above, according to the present invention the following effects and advantages are provided.

The present invention provides a lever switch arrangement used for vehicles comprising a rotary knob, a third lever having the rotary knob fixed at its one end of the third lever and an operation rod at another end thereof, and a movable member adapted to be operated in relation to the third lever having a movable contact and rotatably fixed on a shaft rod. The lever switch arrangement is characterized in that the shaft rod is provided with a first substrate at one end of the shaft rod and a second substrate at another end thereof, and the second substrate is provided with a projection rod to be inserted into a through hole mounted on the first substrate. This arrangement permits the switch to be assembled more efficiently since the movable member and the first substrate can be easily attached on the second substrate.

The present invention further provides a lever switch arrangement in which the second substrate is integrally formed with the shaft rod, and the movable member is rotatably disposed between the first substrate and the second substrate. This arrangement reduces the number of assembling operations and parts, thereby reducing the cost.

The present invention also provides a lever switch arrangement in which the first substrate is adapted to be fixed with a terminal plate having terminals at the lower end portion of the terminal plate and a through hole, and the second substrate is integrally formed with a projection rod to be inserted into the through hole of the terminal plate. This arrangement prevents an insufficient contact since the through hole and the contact projection rod can be used for positioning the first substrate with respect to the second substrate.

The present invention further provides a lever switch arrangement in which the movable member has an engaged portion to be engaged with a gear-shaped operation rod mounted at one end of the third lever, and the third lever is adapted to be fixed with the rotary knob at another end of the third lever. This arrangement makes it possible to increase the rotation angle of the rotary knob and the fixed contacts.

The present invention also provides a lever switch arrangement in which the second substrate has terminals projected at the lower end of the second substrate, the terminals being disposed at the bottom portion of an opening portion of a pole box together with the terminal plate, and the opening portion being closed with a case, and further the terminals being inserted into a connector formed with the pole box. As a result of this construction, the occupation space of the opening of the pole box and its size are minimized.

The present invention further provides a lever switch arrangement in which the third lever is rotatably inserted into a cylinder portion of the second lever to be swingable around a shaft portion, the shaft portion of the second lever is supported by a movable plate adapted to be rotatable in the horizontal direction, and the cylinder portion is freely inserted into the first lever. This construction provides a combination switch having many switches.

The present invention also provides a lever switch arrangement in which the first lever is provided with an operation rod at the base end portion of the first lever, and the operation rod is adapted to operate a first movable member through a push rod in accordance with the rotational operation of the first lever. This arrangement enables plural levers to be disposed on the same axis by using an insertion method.

The present invention further provides a lever switch arrangement in which the push rod is adapted to be supported by a cylindrical portion formed on the movable plate, and the first movable member is movably mounted in the vertical direction between the first substrate and the second substrate. This arrangement further minimizes the occupation space of the combination switch and its size.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A lever switch arrangement used for vehicles, comprising:
   a rotary knob;
   a lever having said rotary knob fixed at one end of said lever and an operation rod at another end thereof; and
   a movable member adapted to be operated in relation to said lever having a movable contact and rotatably mounted on a shaft rod;
   wherein said shaft rod is provided with a first substrate at one end of said shaft rod and a second substrate at another end thereof, and said second substrate is provided with a projection rod separate from said shaft rod to be inserted into a through hole mounted on said first substrate.

2. The lever switch arrangement according to claim 1, wherein said second substrate is integrally formed with said shaft rod, and said movable member is rotatably disposed between said first substrate and said second substrate.

3. The lever switch arrangement according to claim 2, wherein said first substrate is fixed with a terminal plate having terminals at a lower end portion of said terminal plate and a through hole, and said second substrate is integrally formed with a projection rod to be inserted into said through hole of said terminal plate.

4. The lever switch arrangement according to claim 3, wherein said movable member has an engaged portion engaged with said operation rod mounted at one end of said lever, said operation rod being gear-shaped.

5. The lever switch arrangement according to claim 4, wherein said second substrate has terminals projected at a lower end of said second substrate, said terminals being disposed at a bottom portion of an opening portion of a pole box together with said terminal plate, and said opening portion being closed with a case, and further said terminals being inserted into a connector formed with said pole box.

6. The lever switch arrangement according to claim 5, wherein said lever is rotatably inserted into a cylinder portion of a second lever to be swingable around a shaft portion of said second lever, and said shaft portion of said second lever is supported by a movable plate rotatable in the horizontal direction and said cylinder portion is freely inserted into an outer lever.

7. The lever switch arrangement according to claim 6, wherein said outer lever is provided with an operation rod at a base end portion of said outer lever, and said operation rod operates a first movable member through a push rod in accordance with a rotational operation of said outer lever.

8. The lever switch arrangement according to claim 7, wherein said push rod is supported by a cylindrical portion formed on said movable plate, and said first movable member is movably mounted in the vertical direction between said first substrate and said second substrate.

9. The lever switch arrangement according to claim 1, wherein said first substrate is fixed with a terminal plate having terminals at a lower end portion of said terminal plate and a through hole, and said second substrate is integrally formed with a projection rod to be inserted into said through hole of the terminal plate.

10. The lever switch arrangement according to claim 1, wherein said movable member has an engaged portion engaged with said operation rod mounted at one end of said lever, said operation rod being gear-shaped.

11. The lever switch arrangement according to claim 9, wherein said second substrate has terminals projected at a lower end of said second substrate, said terminals being disposed at a bottom portion of an opening portion of a pole box together with said terminal plate, and said opening portion being closed with a case, and further said terminals being inserted into a connector formed with said pole box.

12. The lever switch arrangement according to claim 1, wherein said lever is rotatably inserted into a cylinder portion of a second lever to be swingable around a shaft portion of said second lever, and said shaft portion of said second lever is supported by a movable plate rotatable in the horizontal direction, and said cylinder portion is freely inserted into an outer lever.

13. The lever switch arrangement according to claim 1, wherein an outer lever is provided with an operation rod at a base end portion of said outer lever, and said operation rod operates a first movable member through a push rod in accordance with a rotational operation of said outer lever.

14. The lever switch arrangement according to claim 13, wherein said push rod is supported by a cylindrical portion formed on said movable plate, and said first movable member is movably mounted in the vertical direction between said first substrate and said second substrate.

15. A lever switch arrangement used for vehicles, comprising:

a rotary knob;

a lever having said rotary knob fixed at one end of said lever and an operation rod fixed at another end thereof, said operation rod having a gear-shaped portion with gear teeth; and a movable member rotatably mounted on a shaft rod, said movable member having a movable contact and a gear-shaped portion intermeshed with the gear teeth of said operation rod, whereby said movable member rotates upon rotation of said lever;

said shaft rod being provided with a first substrate at one end of said shaft rod and a second substrate at another end thereof, and said second substrate is provided with a projection rod which is inserted into a through hole mounted on said first substrate, said movable member being rotatably disposed between said first substrate and said second substrate, said first substrate having fixed contacts that are engageable by said movable contact of said movable member.

* * * * *